(12) United States Patent
Phillips et al.

(10) Patent No.: US 7,733,054 B2
(45) Date of Patent: Jun. 8, 2010

(54) THERMAL MANAGEMENT SYSTEMS FOR BATTERY PACK

(75) Inventors: Steven J. Phillips, Ellicott City, MD (US); Daniel J. White, Baltimore, MD (US); Adam M. Casalena, Perry Hall, MD (US); Danh T. Trinh, Parkville, MD (US); Daniele C. Brotto, Baltimore, MD (US); Gregory A. Rice, Aberdeen, MD (US)

(73) Assignee: Black & Decker Inc., Newark, DE (US)

( * ) Notice: Subject to any disclaimer, the term of this patent is extended or adjusted under 35 U.S.C. 154(b) by 459 days.

(21) Appl. No.: 11/551,424

(22) Filed: Nov. 13, 2006

(65) Prior Publication Data

US 2007/0236177 A1    Oct. 11, 2007

Related U.S. Application Data

(60) Provisional application No. 60/731,487, filed on Oct. 31, 2005.

(51) Int. Cl.
*H02J 7/00* (2006.01)
*H02J 7/04* (2006.01)

(52) U.S. Cl. .................... 320/107; 320/115; 320/112; 320/113

(58) Field of Classification Search ........... 320/114, 320/115, 107, 112, 113, 116, 120, 127, 128, 320/137, 132
See application file for complete search history.

(56) References Cited

U.S. PATENT DOCUMENTS

| | | | | |
|---|---|---|---|---|
| 6,204,639 | B1 * | 3/2001 | Takano et al. | 320/150 |
| 6,552,904 | B2 * | 4/2003 | Fung | 361/704 |
| 6,903,534 | B2 * | 6/2005 | Minamiura | 320/150 |
| 7,102,310 | B2 * | 9/2006 | Ishishita | 318/268 |
| 2003/0027037 | A1 * | 2/2003 | Moores et al. | 429/82 |
| 2003/0030984 | A1 * | 2/2003 | Fung | 361/704 |
| 2005/0151514 | A1 * | 7/2005 | Kozu et al. | 320/147 |
| 2005/0258801 | A9 * | 11/2005 | Johnson et al. | 320/110 |

* cited by examiner

*Primary Examiner*—Patrick J Assouad
*Assistant Examiner*—Alexis Boateng
(74) *Attorney, Agent, or Firm*—Harness, Dickey & Pierce, P.L.C.

(57) ABSTRACT

In a cordless power tool system, high temperature gases created in a battery pack by the battery cells during a charging or discharging operation can be routed into a housing of one of an attached power tool or charger to reduce the temperature of the gases, prior to venting the gases externally. In an example, a battery pack has at least one vent hole for relieving pressure and a movable device covering the vent hole and configured to expose the vent hole upon a pressure set-point within the pack housing being exceeded. In another example, the pack housing includes a thin-walled section designed to break if pressure within the pack housing exceeds a given pressure set-point. In a further example, the pack housing includes a baffle having an S-shaped cross-section for providing a vent path for gases and for preventing external fluids from entering the pack housing.

9 Claims, 5 Drawing Sheets

THERMAL MANAGEMENT SYSTEMS FOR BATTERY PACK

PRIORITY STATEMENT

This U.S. non-provisional patent application claims the benefit under 35 U.S.C. §119(e) to U.S. Provisional Patent Application Ser. No. 60/731,487, filed Oct. 31, 2005, the entire contents of which are hereby incorporated by reference.

BACKGROUND

1. Field

Example embodiments relate generally to thermal management in a battery pack of a cordless power tool system having a power tool and charger.

2. Description of Related Art

Rechargeable batteries are used in numerous cordless devices such as cordless products in the home, power tools, laptops, etc. The rechargeable batteries are typically comprised of one or more nickel-cadmium, nickel metal-hydride or Lithium-ion battery cells packaged in a battery pack. In power tool environments, these battery packs include multiple cells and are removably attachable to a power tool and a battery charger.

Battery packs for cordless power tools often are exposed to harsh conditions (e.g., thrown to the ground, dropped, etc.). Also, on a work site the battery packs may be left in the rain, set in puddle of water or even exposed to water while operating the cordless tool. For example, a reciprocating saw may be used to cut overhead pipes which may contain water. If water enters the battery pack, the electronic components inside will not function properly.

Further, as current is drawn off the batteries, i.e., discharged from the cells, to power the tool motor, heat is generated within the battery pack. Also, heat is generated within the pack as charge current flows in the cells from an attached charger. The heat created during discharge and charge operations leads to increased interior housing and cell temperatures which may have a severe effect on the life expectancy and performance of the batteries. In order for batteries to properly charge, the batteries should be below a desired threshold temperature; any differential temperature between the cells in the battery pack should be minimized. If the batteries become too hot during tool use, battery life may be cut short. Also, if a battery is below a certain threshold temperature, the battery will be too cold to charge and should be warmed before charging.

Further, the cells in cordless power tools typically have metal electrodes and an electrolytic liquid (e.g., sulfuric acid). During battery operation, the electrolysis of water may produce hydrogen and oxygen gases, which may accumulate within the battery pack. Accumulation of these gases may create a highly volatile situation, in which a spark or flame could ignite the gases to cause an explosion that can cause serious damage to the tool and/or cause injury to the tool user.

Typically, an approach to removing the gases in a battery pack has been to vent the gases through a vent hole or cap provided on the housing of the battery pack. However, in a case of a cordless Li-ion battery power tool system, the cells could vent gases that are could be at extremely high temperatures, (up to 800° C.). Gases exit the battery pack or tool at such elevated temperatures pose a danger to the tool user.

SUMMARY

An example embodiment is directed to a cordless power tool system having a battery pack for powering a power tool and a charger unit for charging the battery pack. Each of the pack housing and charger housing have openings which align with one another when the battery pack is attached to the charger unit for a charging operation to provide a flow path into the charger housing for heated fluids generated by battery cells of the pack during the charging operation. These heated fluids are cooled within the charger housing prior to exiting the charger housing.

Another example embodiment is directed to a cordless power tool system including a battery pack having a pack housing enclosing a plurality of cells, and a power tool having a tool housing enclosing a plurality of metal components. A top surface of the battery pack housing has a first opening and a bottom surface of the power tool housing has a second opening that meet when the top of the battery pack is attached to a bottom of the power tool. This provides a flow path for heated fluids generated by the cells during power tool operations to flow into the power tool housing. These heated fluids are cooled within the tool housing prior to exiting the tool housing.

In another example embodiment, a battery pack has at least one vent hole formed in its housing for relieving pressure and a movable device covering the at least one vent hole and configured to expose the vent hole upon a pressure set-point within the pack housing being exceeded. In another example, a battery pack housing includes a thin-walled section serving as a pressure relief area and designed to break if pressure within the pack housing exceeds a given pressure setpoint. In a further example, a battery pack housing includes a baffle extending inward into the housing from a bottom surface of the housing, the baffle having an S-shaped cross-section for providing a vent path for gases and for preventing external fluids from entering the pack housing.

BRIEF DESCRIPTION OF THE DRAWINGS

Example embodiments will become more apparent by describing, in detail, example embodiments thereof with reference to the attached drawings, wherein like procedures are represented by like reference numerals, which are given by way of illustration only and thus do not limit the present invention.

DETAILED DESCRIPTION OF EXAMPLE EMBODIMENTS

It should be noted that these Figures are intended to illustrate the general characteristics of method and apparatus of example embodiments of this invention, for the purpose of the description of such example embodiments herein. These drawings are not, however, to scale and may not precisely reflect the characteristics of any given embodiment, and should not be interpreted as defining or limiting the range of values or properties of example embodiments within the scope of this invention. The relative dimensions and size of the cordless device, battery pack and/or battery charger may be reduced or exaggerated for clarity. Like numerals are used for like and corresponding parts of the various drawings.

As used herein, power tools may be understood as a cordless power tool with the use of light-weight portable power sources, such as Li-ion battery packs that may provide the commensurate power with its use. Example power tools may include, but are not limited to, drills, high torque impact wrenches, single-handed metal working tools, nailers, hand planers, circular saws, jig saws, variable speed belt sanders, reciprocating saws, two handed drills such as rotary and demolition thickness hammerdrills, routers, cut-off tools, plate joiners, drill presses, table saws, planers, miter saws, metal working tools, chop saws, cut-off machines, bench grinders, etc. Some of these tools may currently be commercially available only in a corded version, but may become cordless. These classifications are not intended to be inclusive of all power tools in which the example embodiments may be applicable to, but are only illustrative.

Figure 1:
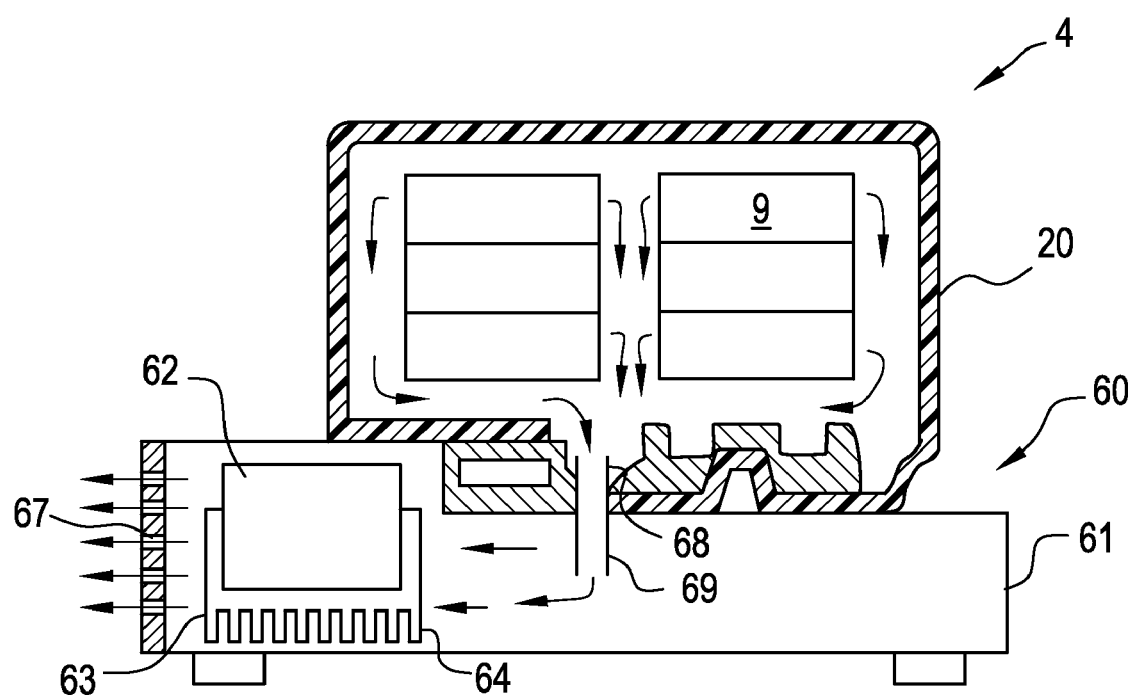
FIG. 1 is a cross-section of a battery pack and charger in accordance with an example embodiment of the present invention.

FIG. 1 is a cross-section of a battery pack and a charger of a cordless power tool system in accordance with an example embodiment of the present invention. As shown in FIG. 1, the battery pack 4 includes a plurality of cells 9 and is releasably attachable to a battery charger unit 60 as is known in the art. As shown, the pack is attached to the charger unit 60 for charging. The charger unit 60 includes an electronic control unit 62 for controlling a desired voltage and current to be delivered from a power source (not shown) to charge the cells 9 of the battery pack 4.

The cells 9 can generate elevated temperature gases during charge. The battery pack 4 includes an opening 68 for expelling these gases into the battery charger unit 60. The charger unit 60 has a corresponding opening 69 which aligns with opening 68 in the battery pack 4. The elevated temperature gases cause increased pressure within the pack 4. A pressure differential or pressure gradient is developed between the higher pressure, hot interior of pack 4 and the ambient air pressure outside of the pack 4. This pressure gradient drives the fluid flow (of the gases) from the battery pack 4 to a lower pressure area (i.e., the battery charger unit 60) through the openings 68, 69. These fluids (high temperature gases) will flow over a heat sink with the battery charger unit 60 to further remove heat contained therein.

The charger unit 60 includes a housing 61 with the electronic control unit 62 and a heat sink 63 therein. In one example, the electronic control unit 62 controls charging of the battery pack 4 and operation of other components in the charger unit 60, and/or in the battery pack 4. The heat sink 63 is positioned in close proximity to the electronic control unit 62 for transferring heat from the battery cells 9. The heat sink 63 includes a plurality of projecting fins 64 to facilitate thermal dissipation and transfer of heat away from the electronic control unit 62.

Heat is removed from the gases by heat sink 63. As such, temperatures of any gases from the interior of battery pack housing 20 will be reduced due to the heat sinking effects of heat sink 63 prior to exiting the charger housing 61 via vents or openings 67. In other words, the elevated temperature fluid (hot gases) generated by the battery cells 9 within the pack 4 during a charge flows into charger housing 61 and is cooled via heat transfer to heat sink 63, such that the fluid expelled through vents 67 in the charger housing 61 at a reduced temperature, as compared to the temperature that fluids were when within the pack 4.

Figure 2:
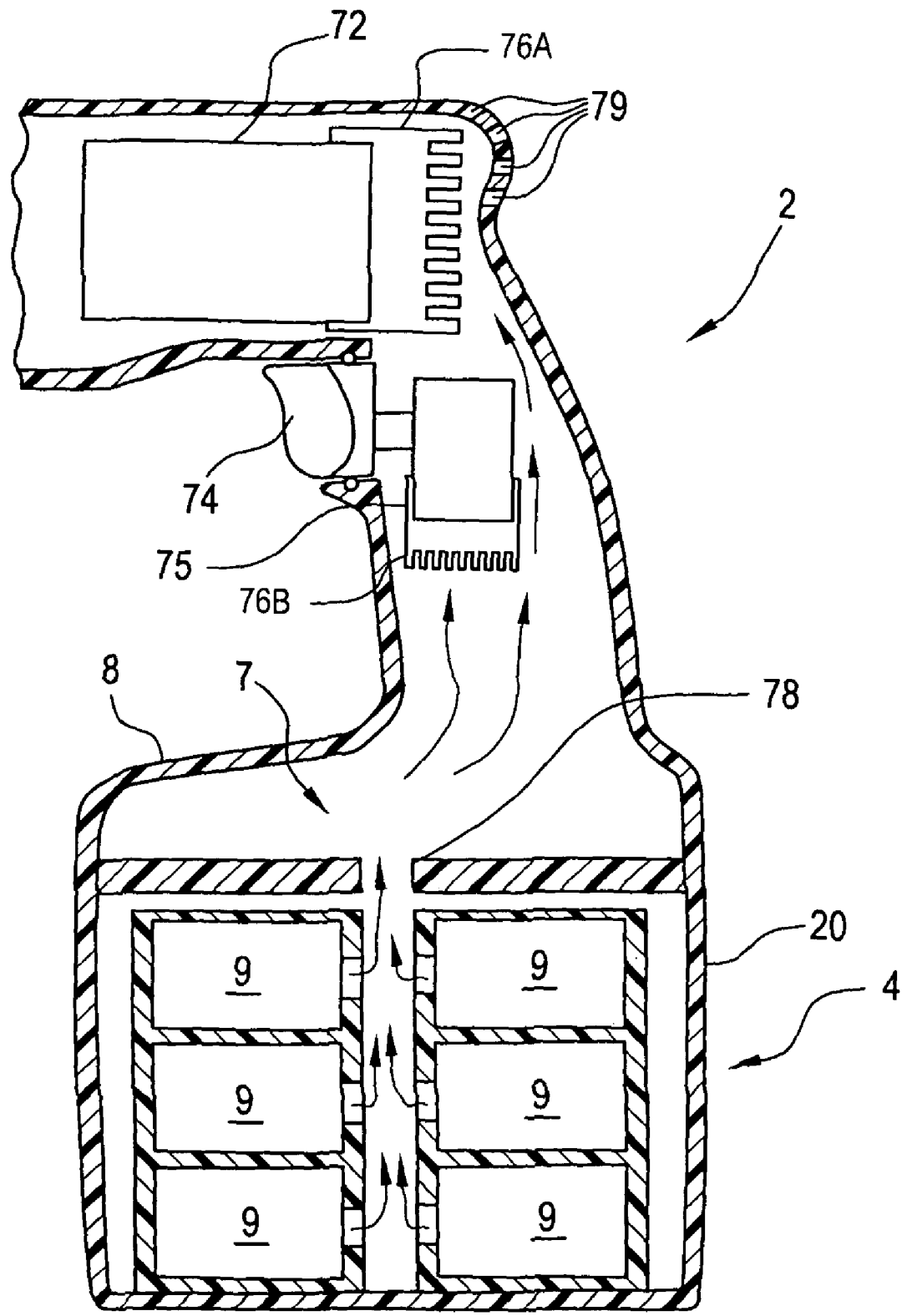
FIG. 2 is a cross-section of a battery pack and tool in accordance with an example embodiment of the present invention.

FIG. 2 is a cross-section of a battery pack and a tool of a cordless power tool system in accordance with another example embodiment of the present invention. Although not shown in FIG. 2, battery pack 4 is removably attachable to a power tool 2 as is known in the art; the particular latch/release mechanism between tool housing 8 and pack housing 20 is immaterial and not a focus of the invention. As shown in FIG. 2, the cells 9 of battery pack 4 can generate elevated temperature gases during power tool operations. The battery pack 4 includes an outlet opening 78 near the top surface of the housing 20 for expelling gases. Opening 78 meets an opening 7 within the interior of tool housing 8.

The elevated temperature gases flow through opening 78 as shown by the arrows in FIG. 2 and are routed up toward cooler internal components within the power tool 2 due to principles of natural convection. The less dense, hotter gases in the battery pack 4 rise into the relatively cool tool housing 8 and over a heat sink. For example, the gases migrate towards a trigger switch component 75 and/or motor 72 which may be cooler than the gases. As a result, the elevated temperature gases transfer the heat to cooler components within tool housing 8. The motor 72 includes a heat sink 76A attached thereto, and the trigger switch component 75 includes a heat sink 76B attached thereto to facilitate heat transfer and remove heat from the gases. In an example, each heat sink 76A and 76B includes a plurality of fins to facilitate heat dissipate so as to remove heat from the gases. Thus, the temperature of gases flowing from opening 78 in the pack housing is reduced in the tool housing 8 as heat from the fluid is transferred to cooler components (motor 72, trigger switch component 75, associated heat sinks, etc.) in the tool 2, so that the gases exit the tool 2 through a plurality of vents 79 at the top of the tool 2.

It should be appreciated that the example embodiments depicted in FIGS. 1 and 2 may include a fan to more easily move fluid within the charger unit 60 and/or tool 2. The fan may be controlled by a manual switch (not shown) in the charger unit 60 to turn ON and OFF the fan. Alternatively, the fan may be coupled and controlled by an electronic unit in the charger 60, battery pack 4 and/or tool 2. An example fan having a motor is described in various figures in commonly assigned U.S. Pat. No. 6,645,666 to Moores, Jr, et al., hereafter the '666 patent, the relevant figures and description describing use of a fan in a battery pack, tool or charger being hereby incorporated by reference herein It should also be appreciated that the example embodiments depicted in FIGS. 1 and 2 may include a Peltier device (not shown) to cool or heat the fluid drawn into the charger unit 60 and/or tool 2. The Peltier device may be coupled with the electronic unit in the charger 60, battery pack 4 and/or tool 2 to deliver cold or hot fluid flow, depending upon if cooling or heating is desired. An example Peltier device is described in various figures in the '666 patent, the relevant figures and description describing use of a Peltier device in a battery pack, tool or charger being hereby incorporated by reference herein.

Figure 3A:
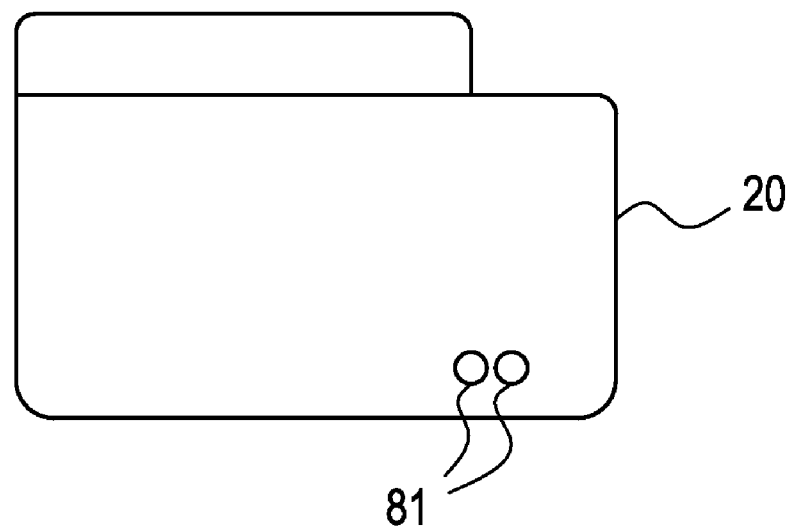
FIGS. 3A and 3B are schematic views of a battery pack in accordance with an example embodiment of the present invention.
Figure 3B:
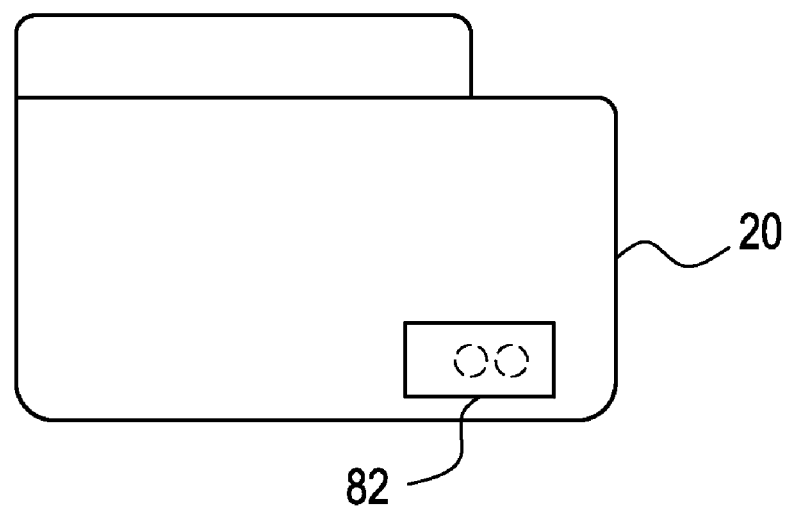

FIGS. 3A and 3B are a schematic view of the battery pack in accordance with another example embodiment of the invention. FIG. 3A illustrates a housing of a battery pack with vent holes. FIG. 3B illustrates the housing of the housing pack with a label covering the vent holes. In FIGS. 3A and 3B, the cells 9 are not shown, it being understood that housing 20 includes cells 9. The embodiments of FIGS. 3A and 3B may be applicable to the embodiments in FIGS. 1 and/or 2, thus the teachings of the above embodiments are incorporated herein.

Referring to FIG. 3A, a plurality of ventilation holes 81 are formed in the housing 20 to enable pressure to be relieved within the battery pack 4. It should be appreciated that the holes 81 may be formed as slots, openings, and/or gaps. The holes 81 are covered with a label 82, as shown in FIG. 3B. The label 82 may be made of a water-proof material to prevent and/or reduce water from entering the battery pack. The label 82 may be adhered to housing 20 with an adhesive on the backside thereof. When the label 82 is adhered to the housing 20 to cover the vent holes 81, the label 82 prevents moisture from entering the battery pack 4 via the vent holes 81. The adhesive on the label 82 is strong enough to provide a water-tight seal yet can release from the housing 20 when a given or pre-set pressure setpoint within housing 20 is exceeded in the battery pack 4. In other words, as the temperature of gases in the plurality of cells 9 increase with power operations (discharge) or during charging operations, the pressure buildup of gases in the battery pack 4 create sufficient force to exceed a given pressure setpoint, so as to overcome the adherence forces of the label 82 to housing to blow out label 82. This results in venting of the elevated temperature gases in the battery pack 4 to a lower pressure area (external of pack 4). It should be appreciated that the given pressure setpoint in the housing 20 may be varied depending on the application.

Figure 4A:
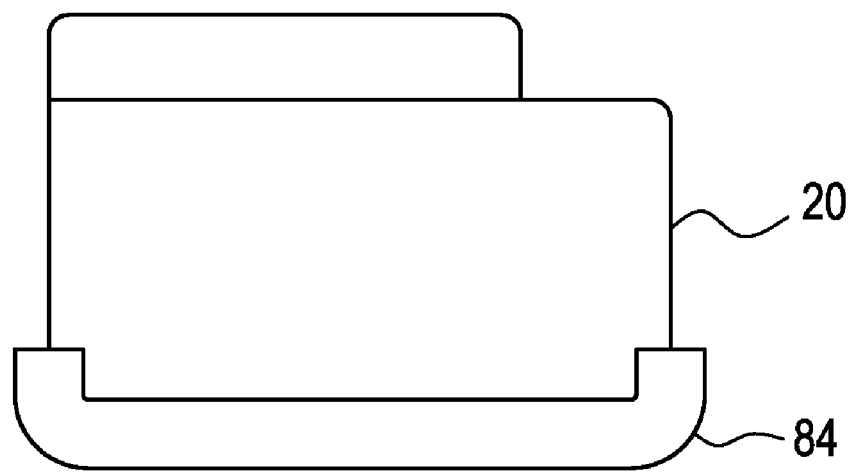
FIGS. 4A and 4B are schematic views of a battery pack in accordance with another example embodiment of the present invention.
Figure 4B:
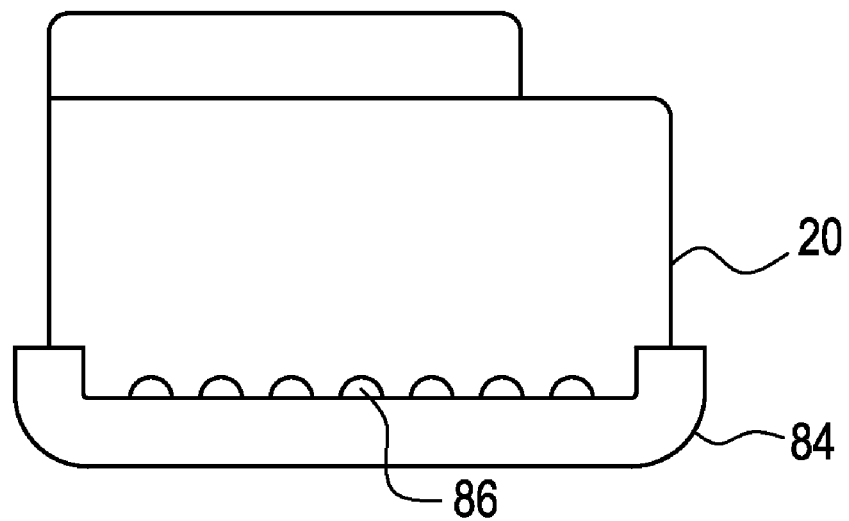

FIGS. 4A and 4B are schematic views of the battery pack in accordance with another example embodiment. In FIGS. 4A and 4B, the cells 9 are not shown, it being understood that housing 20 includes cells 9. The embodiments of FIGS. 4A and 4B may be applicable to the embodiments in FIGS. 1 and/or 2, thus the teachings of these embodiments are incorporated herein.

As shown in FIGS. 4A and 4B, the battery pack 4 includes a housing 20 and a plurality of openings or vent-holes 86 covered by an over-molding 84. The openings 86 are located at the bottom of the battery pack 4, and the over-molding 84 is also affixed to the bottom of the battery pack 4 to cover/uncover the plurality of openings 86. The over-molding 84 may be made of, for example, but not limited to, a rubber material.

The over-molding 84 is thus fixed to housing 20 but in an example can be removeably attached thereto. In an example, the over-molding 84 can be attached to housing 20 by chemical bonding or by friction. Elastic deformation of over-molding 84 due to pressure changes enables it to be moved or shifted to cover or uncover the vent holes or openings 86 (e.g., the over-molding 84 moves up and down). The over-molding 84 moves when a given pressure setpoint is reached in the battery pack 4 (e.g., pressure relief area). In the event that pressure is built up in the battery pack 4, the over-molding 84 moves down due to the pressure to uncover the openings 86 in the housing 20 so as to release the elevated temperature gases through the vents 81. When the pressure within the battery pack 4 is relieved, the over-molding 84 moves back to cover the openings 86.

In more detail, as pressure within the pack increases due to the increasing temperatures of the cells 9 during charge, the pressure creates a force on the over-molding 84 through the openings 86. This force elastically deforms the over-molding 84, exposing the openings 86 and allowing the gas to escape. When the pressure drops in the pack 4 (due to escaping gas), the force on the over-molding 84 is reduced. Since the over-molding 84 was only elastically deformed (it didn't yield and experience plastic deformation) it returns to its original position. In other words, the over-molding 84 re-seals itself after the elevated temperature gases are vented, thus preventing any water from entering the battery pack 4 which may cause damage to the internal components of the battery pack 4.

Figure 5:
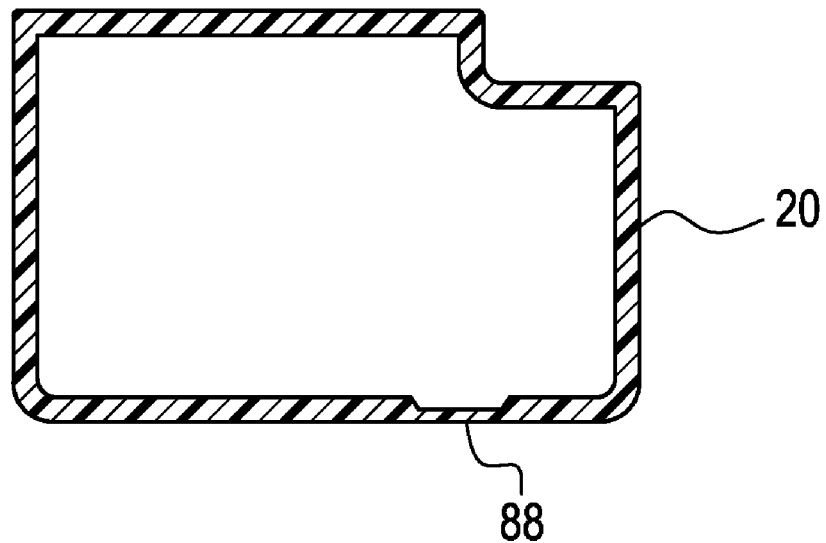
FIG. 5 is a cross-section of a battery pack in accordance with another example embodiment of the present invention.

FIG. 5 is a cross section of a battery pack in accordance with another example embodiment of the present invention. In FIG. 5, the cells 9 are not shown, it being understood that housing 20 includes cells 9. The embodiment of FIG. 5 is applicable to the embodiments in FIGS. 1, 2, separate from or in conjunction with the features shown in either FIGS. 3A/3B or FIGS. 4A/4B.

As shown in FIG. 5, the battery pack housing 20 includes a thin-walled section 88 that acts as pressure relief area. The housing 20 may be manufactured with this thin-walled section 88. The thin-walled section 88 is designed to break or separate in accordance with a given or pre-set pressure setpoint being exceeded within pack 4. Thus, if pressure is built up in the battery pack 4 due to the formation of high temperature gases coming from the cells 9 during a charge or discharge, or due to some fault event in the pack 4 so as to exceed the pressure setpoint, the thin-walled section 88 breaks and releases the elevated temperature gases, reducing pressure within pack housing 20.

Figure 6:
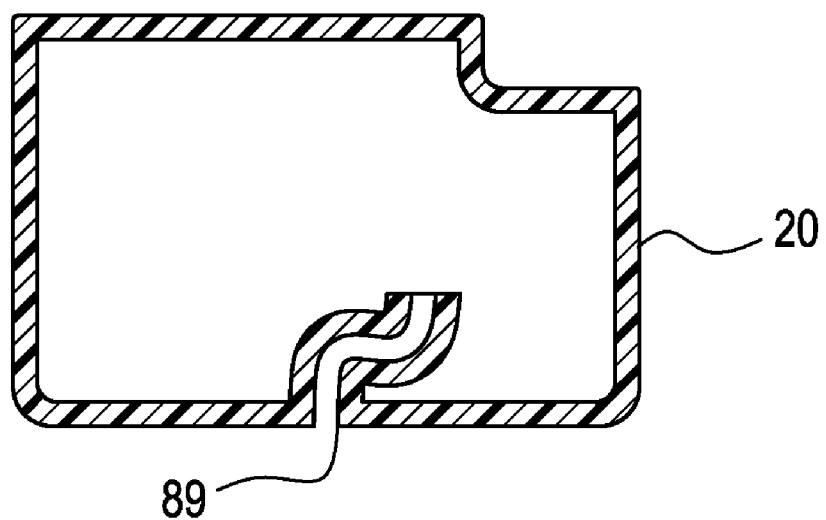
FIG. 6 is a cross-section of a battery pack in accordance with another example embodiment of the present invention.

FIG. 6 is a cross section of a battery pack in accordance with another example embodiment of the present invention. The features of FIG. 6 can be employed in combination with the pack 4 as shown in the embodiments of FIGS. 1 and 2. As shown in FIG. 6, the battery pack 4 includes a housing 20 and a baffle 89 within the housing 20. The baffle 89 extends inwardly from a bottom surface of the battery pack housing 20. The baffle 89 has an S-shaped cross-section, for example. The S-shaped baffle 89 acts as a trap for any fluid in the baffle 89. In other words, the baffle 89 provides a vent path in the housing 20 to allow gas flow but prevents external fluids such as water from entering into the interior of housing 20.

The example embodiments being thus described, it will be obvious that the same may be varied in many ways. Such variations are not to be regarded as departure from the spirit and scope of the example embodiments, and all such modifications as would be obvious to one skilled in the art are intended to be included within the scope of the appended claims.

What is claimed:

1. A cordless power tool system, comprising:
a battery pack having a pack housing enclosing a plurality of cells for providing power to a power tool,
a charger unit having a charger housing enclosing an electronic control and a heat sink in a thermal transfer relationship to the electronic control to transfer heat between the electronic control and the heat sink, the battery pack releasably attachable to the charger unit for a charging operation,
wherein each of the pack housing and charger housing have openings that align with one another when the battery pack is attached to the charger unit for a charging operation to provide a flow path into the charger housing for heated fluids generated by the cells of the pack during the charging operation.

2. The system of claim 1, wherein the heated fluids flow from the battery pack housing into the charger housing due to a pressure gradient formed due to the difference between a higher interior pressure within the pack due to the temperature of the heated gases and a lower outside ambient air pressure, the pressure gradient driving the fluid flow into the charger housing and over the heat sink therein to reduce the temperature of the fluids.

3. The system of claim 2, wherein the charger housing includes vents to expel the fluids from the charger housing after being cooled within the charger housing due to heat transfer to the heat sink.

4. The system of claim 1, wherein the pack opening is formed in a bottom surface of the pack housing and the charger opening is formed in an upper surface of the charger housing.

5. A cordless power tool system, comprising:
a battery pack having a pack housing enclosing a plurality of cells,
a power tool having a tool housing enclosing an electronic control and a heat sink in a thermal transfer relationship to the electronic control to transfer heat between the electronic control and the heat sink,
the battery pack releasably attachable to the power tool for powering a tool motor, wherein a top surface of the pack housing has a first opening and a bottom surface of the power tool housing has a second opening which meet when the top of the battery pack is attached to a bottom of the power tool, the battery pack and power tool configured to provide a flow path for heated fluids generated by the cells during power tool operations to flow into the power tool housing.

6. The system of claim 5, wherein the heated fluids flow into the tool housing due, in part, to natural convection as a result of heat transfer from the heated fluids through the heat sink to the electronic control causing the temperature within the power tool to be comparatively lower than the temperature of the heated fluids inside the battery pack.

7. The system of claim 6, wherein the electronic control is a trigger switch component.

8. The system of claim 7, wherein the power tool further comprises a tool motor and a second heat sink in a heat transfer relationship to the tool motor to transfer heat between the tool motor and the second heat sink to facilitate heat transfer and remove heat from the heated fluids.

9. The system of claim 8, wherein the tool housing includes vents at an upper end thereof to expel the heated fluids from the tool housing after being cooled within the tool housing due to heat transfer through the heat sinks.

* * * * *